Dec. 19, 1967  G. J. ROSZKOWSKI  3,358,481
PROTECTION SYSTEM
Filed May 3, 1965  2 Sheets-Sheet 2
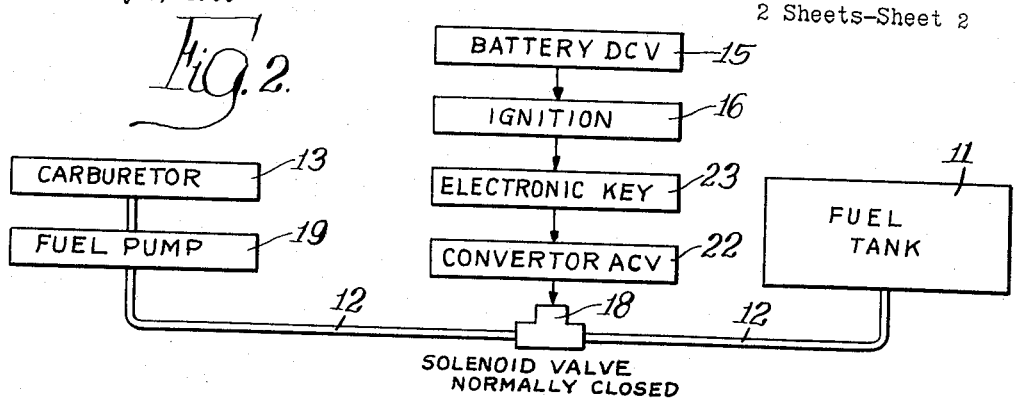
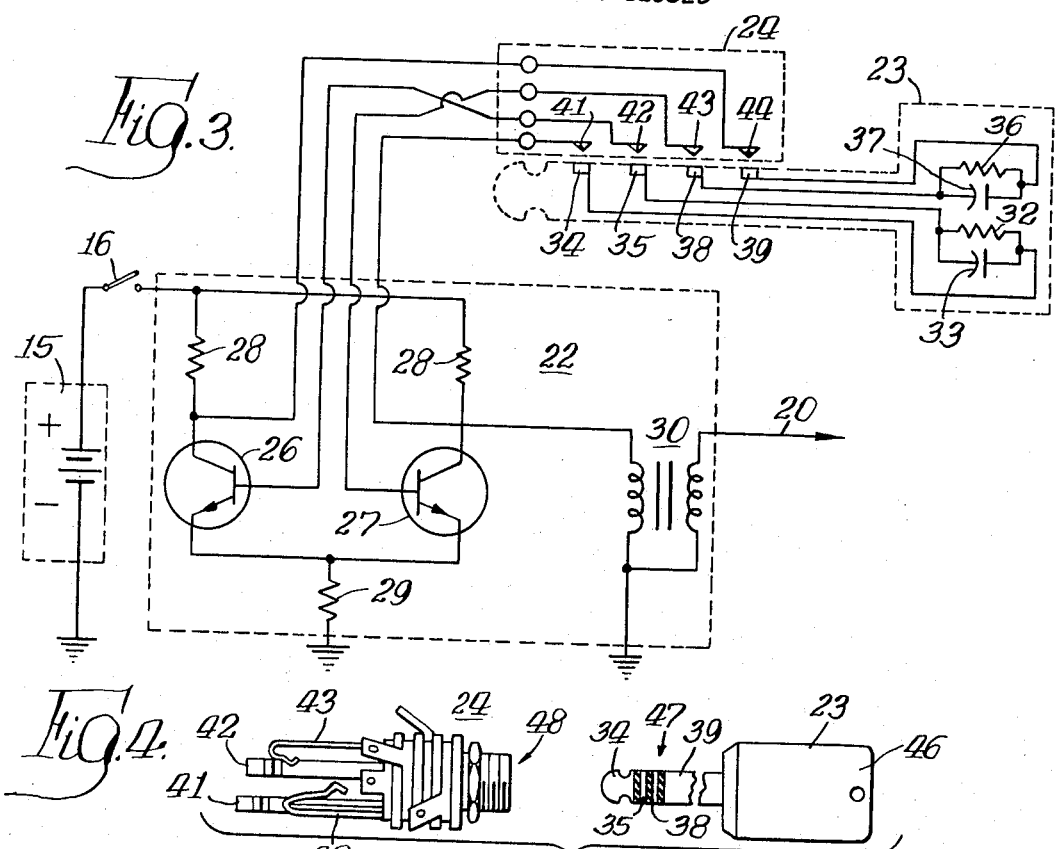
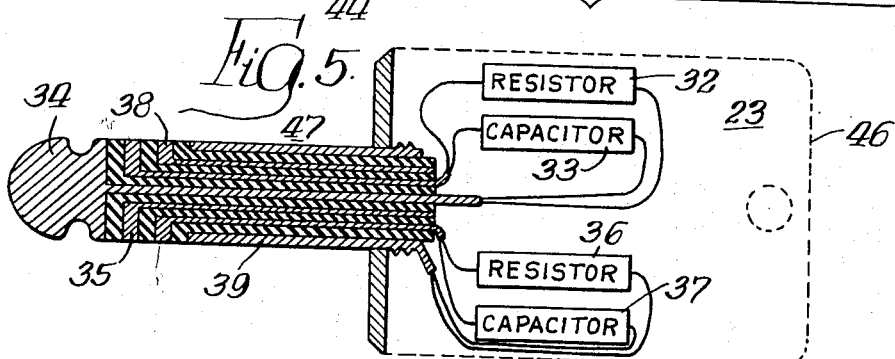

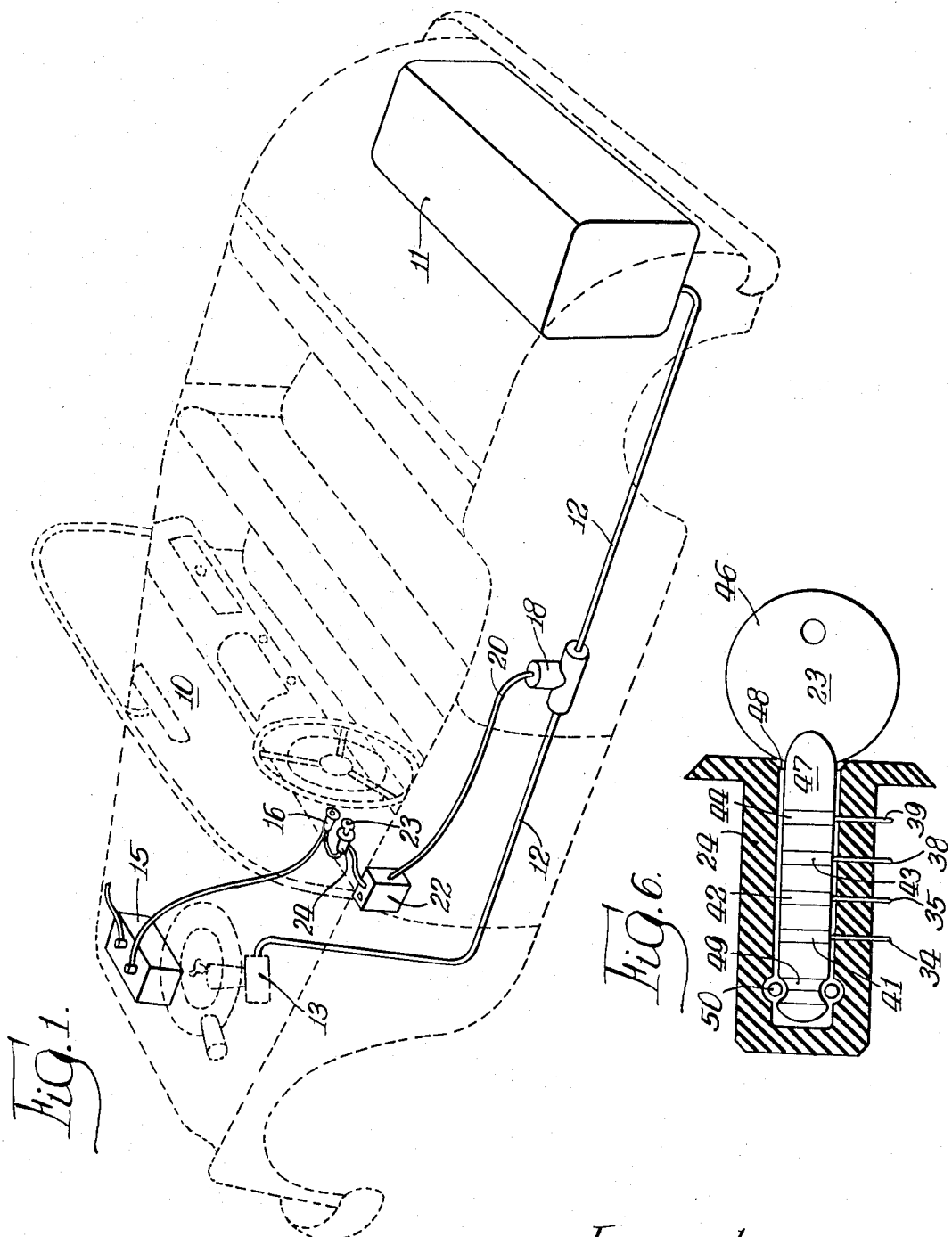

United States Patent Office 3,358,481
Patented Dec. 19, 1967

3,358,481
PROTECTION SYSTEM
Gregory J. Roszkowski, 1301 N. Harlem Ave.,
Oak Park, Ill. 60305
Filed May 3, 1965, Ser. No. 452,814
7 Claims. (Cl. 70—243)

ABSTRACT OF THE DISCLOSURE

A theft protection system uses a normally closed A.C. solenoid valve connected in series in the fuel line of an automobile. The solenoid is connected to an oscillator which converts the D.C. energy from the automobile battery into A.C. energy which opens the valve. A portion of the oscillator circuit is mounted on a removable key, preventing the solenoid valve from being opened until the key is coupled to the oscillator.

---

This invention relates to a protection system, and more particularly to a protection system which can only be disabled by authorized persons using a special key.

The protection system is particularly adapted for preventing the theft of a motor vehicle, and will be described in conjunction with such a system, although the invention is in no way to be limited thereto. As will be apparent, the invention is equally applicable for protecting many systems, as for example locking the door to a building.

A practical theft protection system must be both foolproof and extremely simple to operate. For example, if a theft protection system for a passenger vehicle is to gain acceptance by the public, it must be no more complicated to operate than the conventional ignition key and switch for activating the vehicle's eletcrical system. Many prior protection systems have provided a concealed switch, or combination type lock which are unsatisfactory in a practical system capable of being mass produced for a large number of vehicles.

An example of a prior protection system is shown in Patent 1,476,166 to Mitchell. In this patent, the flow of fuel in an automobile is prevented until a switch member is closed. This switch causes a complicated mechanism, using different levels of D.C. power, to open a valve located in the fuel line. This switch is controlled by a lock, as a combination lock. The purpose of the Mitchell device can easily be defeated by jumping the switch device itself.

In accordance with the present invention, a device is provided which can only be activated by an energy of different characteristic from the energy available in the vicinity of the system. The activation of this device disables the protection system. A special key, which incorporates an essential part of the protection system itself, must be inserted into a special socket before the energy of different characteristic is made available to the device.

For example, a normally closed valve is connected in the fluid fuel line of an automobile. This valve can only be activated by a power of different characteristic from the D.C. power available from the vehicle's storage battery. A convertor is provided for changing the available D.C. power into a different type of power suitable for energizing the valve. This convertor can only be energized by means of a special key which incorporates part of the convertor circuit.

A principal object of this invention is to provide an improved protection system which can only be disabled by authorized persons.

Another object of this invention is to provide a theft protection system operated by a special key which incorporates an essential part of the protection system itself.

One feature of this invention is the provision of a convertor for changing the available power into a different type of power required to disable the protection device. This convertor prevents a thief from defeating the purpose of the protection system by using jumper cable to connect the available power directly to the protection device itself.

Another feature of this invention is the provision of a protection system utilizing a normally closed solenoid valve for preventing the flow of fuel in a vehicle until the solenoid is energized with a power of different characteristic than that available from the power source of the vehicle itself.

Yet another feature of this invention is the provision of an electronic key composed of a number of electrical components necessary to the operation of the convertor. The circuit in the convertor is incomplete and therefore inoperative until the electronic key is inserted in a special socket which connects the electrical components mounted thereon to the remainder of the components in the convertor.

A further feature of this invention is the provision of an A.C. energized solenoid valve which is normally closed when unenergized to prevent the flow of fuel in a vehicle. An electronic convertor is provided in the vehicle for changing the D.C. voltage available from a battery to an A.C. voltage necessary to energize the solenoid. A portion of the electronic components necessary to complete the convertor circuit are mounted on a separate key which is similar to the ignition key of the vehicle. The electronic key must be inserted into a socket to complete the electrical circuit of the convertor. Furthermore, the electronic key for one vehicle is preferably different from the electronic keys of other vehicles.

Further features and advantages of the invention will become apparent from the following specification and from the drawings, in which:

FIGURE 1 is a diagrammatic representation of the protection system mounted in a motor vehicle;

FIGURE 2 is a block diagram illustrating the interconnection of the components shown in FIGURE 1;

FIGURE 3 is a schematic diagram illustrating one embodiment of the electronic convertor and the electronic key utilized therewith;

FIGURE 4 is a side view of one embodiment of the the electronic key.

FIGURE 5 is a side view, partly in section, of the electronic key illustrated in FIGURE 4;

FIGURE 6 is a side view of another embodiment of the electronic key.

While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiment illustrated. The scope of the invention will be pointed out in the appended claims.

Turning now to FIGURE 1, a motor vehicle 10 is generally illustrated in broken lines. A source of fluid, as a fuel tank 11, is connected through a fluid path, in the form of a fuel line 12, to utilization means, as a carburetor 13 for the engine of vehicle 10. A source of electrical energy, as a battery 15 for producing D.C. voltage, is connected through an ignition switch 16 to a conventional electrical system (not illustrated) for the vehicle.

In the absence of the applicant's invention, the vehicle 10 may be started by an unauthorized person by using electrical conductors, or "jumper" cables, to connect the battery 15 directly to the vehicle's electrical system, bypassing the ignition key 16. The protection system, illustrated in FIGURES 1 and 2, is designed to prevent the theft of the vehicle and is no more complicated to operate than the conventional ignition key and switch for activating the vehicle's electrical system. A solenoid valve 18 is connected in series with the fuel line 12. Valve 18 is normally closed, thus preventing the flow of fuel from tank 11, through line 12 and a fuel pump 19, illustrated diagrammatically in FIGURE 2, to carburetor 13. The solenoid valve 18 is energized with a power of different characteristic than the one available from the battery 15 of the vehicle 10 in which the system is installed. For example, valve 18 may be energized only by an A.C. voltage of certain magnitude and frequency. When the energizing voltage is present on electrical conductors in cable 20, solenoid valve 18 will open, allowing fuel to flow through line 12. It will be recognized that solenoid valve 18, by itself, may be any normally closed valve means which is opened when its solenoid is energized by the proper voltage.

A convertor 22 is mounted in vehicle 10 for changing the D.C. voltage available from battery 15 into the proper A.C. voltage for energizing solenoid valve 18. Convertor 22 can only be activated when a special "electronic" key 23 is inserted into a receiver, in the form of a socket 24 conveniently located in vehicle 10, and which is similar in appearance to ignition switch 16.

In FIGURE 2, the battery 15 is connected to convertor 22 when the ignition switch 16 is closed. If desired, the battery 15 can be directly connected to convertor 22 at all times, since without the electronic key 23, convertor 22 will not operate.

When an authorized operator wishes to use vehicle 10, the ignition switch 16 is closed with the standard ignition key to energize the vehicle's electrical system. The valve system, however, remains deenergized with the valve closed until the electronic key 23 is inserted into socket 24, thereby enabling convertor 22 to change the D.C. voltage from battery 15 into an A.C. voltage which will open valve 18. If the ignition key alone is used, or the ignition switch 16 is bypassed by means of jumper cables, the motor will start and run only as long as there is fuel in the carburetor 13. After the initial supply of fuel is used, up, the motor will stop until more fuel is supplied. It is therefore apparent that vehicle 10 can only be operated by authorized personnel having the special electronic key 23, which will hereinafter be described in detail.

The electronic key may be added to existing vehicles by connecting the socket 24 in series with the ignition key, as shown in FIGURE 2. If the protection system is built into new vehicles, the electronic key can replace the ignition key entirely, or the electronic key and the ignition key can be combined into a single key providing both functions.

A detailed embodiment of convertor 22 and electronic key 23 is illustrated in FIGURE 3. The D.C. to A.C. voltage convertor is composed of a transistorized multivibrator having NPN transistors 26 and 27. The collector of each transistor is coupled through a resistor 28 to one terminal of battery 15. The emitters of each transistor are coupled through a common resistor 29 to the other terminal of battery 15. The collector of transistor 27 is coupled to a transformer 30 which provides an A.C. voltage to conductor cable 20. The electrical components, including active elements 26 and 27, form a first circuit means which, by itself, is incomplete and incapable of converting D.C. voltage to A.C. voltage.

A second circuit means, which is necessary for operation of the transistorized multivibrator, are contained in electronic key 23. A first paralleled resistor 32 and capacitor 33 are coupled to electrical contact members 34 and 35 on key 23. A second paralleled resistor 36 and capacitor 37 are similarly coupled to electrical contact members 38 and 39. When electronic key 23 is inserted into socket 24, the electrical contact members 34, 35 and 38, 39 abut contact elements 41 through 44 respectively. These elements 41–44 may be spring loaded if desired. The parallel RC networks provide the feedback necessary between the collector of one transistor and the base of the other transistor to allow the multivibrator to oscillate in a manner well known in the art.

It will be appreciated that convertor 22 cannot be activated unless the second circuit on key 23 is conupled to the first circuit located in the vehicle 10. Thus, the key 23 does not act to merely close an electrical switch, which function can easily be bypassed, but rather forms an essential part of the electronic convertor 22; a part which cannot be improvised by a thief.

One embodiment of key 23 and socket 24 is illustrated in FIGURE 4. The key 23 of FIGURE 4 is also illustrated in more detail in FIGURE 5. A base 46, which may take the form of a housing, holds the individual passive electrical components of the key. An elongated shaft 47 has electrical contact members 34, 35, 38, and 39 mounted therein. The socket 24 has spring loaded contact elements 41–44 thereon which are urged into engagement with the contact members of key 23 only when key 23 is fully inserted into the socket 24. Shaft 47 has a particular shape which can be inserted through an opening 48 of only the corresponding socket 24 for that key.

Another embodiment of key 23 and socket 24 is illustrated in FIGURE 6. In this embodiment, base 46 is comprised of a flat section formed into a shape similar to the shape of the ignition key for that vehicle. The passive electrical components are mounted within the shaft 47, and are coupled to the corresponding contact members. The end of shaft 47 is provided with a shallow depressed portion 49 for holding key 23 within socket 24 by means of a detent spring 50.

It is of course obvious that if all systems were alike, the protection system described would become ineffective unless the convertor 22 and key 23 of each system was, as far as possible, in some way different. For this purpose, the electronic key 23, the socket 24, and the value and type of components in convertor 22 can all be varied. For example, only a certain range of component values for the RC networks will work in a particular multivibrator circuit. The values of the components in key 23 can therefore be varied to provide different keys.

For systems utilizing the same value of components, the spacing and order of electrical contact members 34, 35 and 38, 39 can be varied. Furthermore, each electrical component in key 23 could be provided with its own pair of contact members. In the key illustrated in FIGURE 3, eight contact members and corresponding elements would be necessary, thus providing a large number of possible arrangements for spacing and sequence in order to produce different keys. The physical shape of each key can also be varied to prevent other keys from being inserted in the socket 24 of a similar vehicle provided with the protection system described.

The novel protection system disclosed herein is in no way to be limited to the particular electronic convertor 22 and electronic key 23 illustrated. The convertor itself can be any device that will change the available energy into an energy of different characteristic necessary to energize the valve means 18 and allow the flow of fluid through a fluid line. Convertor 22 may be an oscillator, dynamotor, alternator, or any other device in which an essential portion of the circuit can be mounted on a movable key independent of the system itself.

It will be appreciated that the protection system described may be used for many applications, and is not to be limited to use in vehicles. The invention is usable wherever a device is to be energized by a power of different characteristic than that available. For example, the door on a building which has conventional A.C. power therein may be locked by means of a D.C. solenoid. When the electronic key is inserted into the receiver, the convertor will change the A.C. power to D.C. power, thereby energizing the solenoid and unlocking the door. Thus, the protection system is disabled by inserting a single key in a socket, but cannot otherwise be easily disabled without great experimentation.

I claim:

1. In a system having a source of energy of a first character and a source of fluid coupled through a fluid path to fluid utilization means, a protection system for blocking the flow of fluid through said fluid path, comprising in combination: valve means closed when unenergized, connected in series in said path to prevent fluid flow therein, said valve means being opened to permit fluid flow only when energized by an energy of a second character different from said energy of a first character; convertor means coupled to said source of energy for changing said energy of a first character to said energy of a second character only when said convertor means is activated, said convertor means being composed of a first and a second circuit means, both of said circuit means being essential to activate said convertor means; means coupling said convertor means to said valve means; means connecting said first circuit means with said system; receiver means coupled to said first circuit means; and movable base means mounting said second circuit means, said base means being insertable in said receiver means to couple said second circuit means to said first circuit means, thereby activating said convertor means, causing said valve means to open.

2. In a vehicle having a vehicle source of energy of a first character, a source of fuel, and fuel utilization means, a protection system to prevent theft of the vehicle, comprising in combination: valve means closed when unenergized, connected between said source of fuel and said utilization means to prevent the flow of fuel therebetween, said valve means being opened to permit the flow of fuel only when energized by an energy of a second character different from said energy of a first character; convertor means coupled to said vehicle source for changing said energy of the first character into said energy of the second character only when said convertor means is activated, said convertor means being composed of a first and a second circuit means, both of said circuit means being essential to activate said convertor means; means coupling said convertor means to said valve means; means mounting said first circuit means in said vehicle; receiver means mounted on said vehicle and coupled to said first circuit means; base means mounting said second circuit means independent of said vehicle, said base means being insertable in said receiver means to couple said second circuit to said first circuit, thereby activating said convertor means, causing said valve means to open.

3. In a vehicle having a vehicle source of energy of a first character, a source of fuel, and fuel utilization means, a protection system to prevent theft of the vehicle, comprising in combination: valve means closed when unenergized, connected between said source of fuel and said utilization means to prevent the flow of fuel therebetween, said valve means being opened to permit the flow of fuel only when energized by energy of a second character different from said energy of a first character; convertor means coupled to said vehicle source for changing said energy of the first character into said energy of the second character only when said convertor means is activated, said convertor means being composed of a first circuit means and a second circuit means comprised of only passive electrical components, said convertor means being activated only when said second circuit means is coupled to said first circuit means; means coupling said convertor means to said valve means; means mounting said first circuit means in said vehicle; base means mounting said second circuit means independent of said vehicle; and receiver means mounted on said vehicle, having an aperture and electrical contact elements coupled to said first circuit means, said receiver being adapted to hold and retain said base means when inserted in said aperture and couple said contact elements to said passive electrical components, thereby activating said convertor means, causing said valve means to open only when said base means is inserted in said aperture and to close as soon as said base means is removed from said aperture.

4. In a vehicle having a vehicle source of energy of a first character, a source of fuel, and fuel utilization means, a protection system to prevent theft of the vehicle, comprising in combination: valve means closed when unenergized, connected between said source of fuel and said utilization means to prevent the flow of fuel therebetween, said valve means being opened to permit the flow of fuel only when energized by energy of a second character different from said energy of a first character; a convertor circuit for transforming energy of the first character to energy of the second character having an input connected with said source and an output connected with said valve; socket means having terminals connected with said convertor circuit; a plug-in device removably received in said socket; said device having incorporated therein at least one circuit element required for operation of said convertor circuit and connected in said circuit when said device is received in said socket.

5. In a vehicle having a battery for supplying D.C. energy, a source of fuel, and fuel utilization means, a protection system to prevent theft of the vehicle, comprising in combination: valve means closed when unenergized, connected between said source of fuel and said utilization means to prevent the flow of fuel therebetween, said valve means being opened to permit the flow of fuel only when energized by A.C. energy; converter means coupled to said battery for changing said D.C. energy to A.C. energy only when said convertor means is activated, said convertor means being composed of a first circuit means, and a second circuit means comprised of passive electrical components, said converter means being activated only when said second circuit means is coupled to said first circuit means; means coupling said converter means to said valve means; means mounting said first circuit means in said vehicle; receiver means mounted in said vehicle, having an aperture and electrical contact elements coupled to said first circuit means; base means mounting said second circuit means independent of said vehicle, said base means being insertable in said aperture to couple said contact elements to said passive electrical components, thereby activating said convertor means, causing said valve means to open.

6. In a system having a source of D.C. energy, a source of fuel, and fuel utilization means, a protection system, comprising in combination: valve means closed when unenergized, connected between said source of fuel and said utilization means to prevent the flow of fuel therebetween, said valve means being open to permit the flow of fuel only when energized by A.C. energy; convertor means coupled to said source of D.C. energy for changing said D.C. energy into A.C. energy only when said convertor means is activated, said convertor means being composed of a first circuit means and a second circuit means comprised of only passive electrical components, said convertor means being activated only when said second circuit means is coupled to said first means; means coupling said first circuit means to said valve means; a socket having an opening and electrical contact elements associated therewith, said contact elements being coupled to said first circuit means; a key comprising a base and an elongated shaft having electrical contact members thereon, means mounting said second circuit means on said key with said electrical components coupled to said electrical contact members, said elongated shaft being insertable into said opening to urge the contact elements against the electrical contact members, thereby coupling said second circuit to said first circuit to activate said convertor means, causing said valve means to open.

7. In a vehicle having a battery for supplying D.C. energy, a source of fuel, and fuel utilization means, a protection system to prevent theft of the vehicle, comprising in combination: valve means closed when unenergized, connected between said source of fuel and said utilization means to prevent the flow of fuel therebetween, said valve means being opened to permit the flow of fuel only when energized by A.C. energy; convertor means coupled to said battery for changing said D.C. energy into A.C. energy, said convertor means being composed of a first circuit means including active electrical components and a second circuit means including resistive and capacitive components, said convertor means being operable only when said second circuit is coupled to said first circuit means; means coupling said convertor means to said valve means; means mounting said first circuit means in said vehicle; a key, independent of said vehicle, having a base and an elongated shaft with electrical contact members thereon, said second circuit means being mounted on said key with said resistive and capacitive components coupled to said contact members; a socket mounted on said vehicle, having an opening and electrical contact elements coupled to said first circuit means, said socket being adapted to hold said key when said elongated shaft is inserted through said opening, urging said contact elements against said contact members to couple said second circuit to said first circuit, thereby activating said convertor means, causing said valve means to open.

References Cited

UNITED STATES PATENTS

| | | | |
|---|---|---|---|
| 1,476,166 | 12/1923 | Mitchell | 70—242 |
| 1,542,445 | 6/1925 | Gravel | 70—243 |
| 3,093,994 | 6/1963 | Richard | 70—282 |
| 3,136,307 | 6/1964 | Richard. | |
| 3,177,422 | 4/1965 | Schlereth | 331—113 X |

BOBBY R. GAY, *Primary Examiner.*